United States Patent Office 3,564,704
Patented Feb. 23, 1971

3,564,704
METHOD OF MANUFACTURING NUCLEAR FUEL ELEMENT
Melville Albert Feraday, Deep River, Ontario, Canada, assignor to Atomic Energy of Canada Limited, Ottawa, Ontario, Canada, a corporation of Canada
No Drawing. Continuation-in-part of application Ser. No. 647,246, June 19, 1967. This application June 4, 1968, Ser. No. 734,240
Int. Cl. B23p *17/00, 25/00*
U.S. Cl. 29—527.7                                        17 Claims

ABSTRACT OF THE DISCLOSURE

The method of manufacturing a nuclear reactor fuel element having a core of delta phase ($U_3Si$) uranium-silicon alloy including the steps of heat treating the uranium-silicon alloy core at about 800° C. for a period of time to transform the alloy peritectoidally to the delta phase and surrounding the core by sheathing. The core contains a void space either in the form of a central hollow core or in the form of uniformly dispersed porosity in the range 3–25% of the volume of the core.

CROSS-REFERENCE TO RELATED APPLICATION

This application is a continuation-in-part of application Ser. No. 647,246 filed June 19, 1967, and now abandoned.

BACKGROUND OF THE INVENTION

This invention relates to a method of manufacturing a nuclear reactor fuel element having a central core of delta phase ($U_3Si$) uranium-silicon alloy and an outer restraining sheath of zirconium alloy.

One major problem in the design of uranium alloy fuel elements is the poor corrosion resistance of most high uranium alloys when exposed to high temperature water collant. Because of this poor aqueous corrosion resistance, any defect occurring in the protective sheath surrounding the uranium alloy has severe and undesirable consequences.

Certain uranium-silicon alloys are unique among the homogeneous uranium metal alloys in having a low aqueous corrosion rate and low parasitic neutron absorption and, hence, are particularly suitable for use with high temperature water collant. Alloys having a composition approaching the delta phase ($U_3Si$) are particularly useful in that the delta phase has the highest uranium density of such intermetallic compounds. The corrosion rate of delta phase ($U_3Si$) uranium-silicon alloy in 295° C. water is about 2 mg./cm.²/hr. which is sufficiently low to make its use desirable in the fuel element of the present invention.

Previously the use of uranium-silicon alloys having a composition in the region of the delta phase was restricted because these alloys exhibit undesirable volume instability under irradiation. The swelling in volume of the order of 4%, is attributable to disordering of the ordered delta phase and/or the break away of bubbles of gaseous fission products from surface tension restraint.

The fuel element of applicant's copending application Ser. No. 647,246, comprises a novel structure which overcomes these difficulties and permits the use of uranium-silicon alloy fuels having compositions in the region of the delta phase. This fuel element includes a central core of uranium alloyed with silicon in the range 2–7.3 wt. percent and heat treated so as to form a corrosion resistant alloy. Preferably, the delta phase, $U_3Si$, is used. The uranium alloy may contain minor additions of other metals such as Al, C, Fe or Cr to total amount of less than 2,000 p.p.m., to reduce swelling caused by irradiation. In a modified form of this fuel element a void space is formed in the central core having a volume in the range 3–25% of the volume of the uranium-silicon alloy. The size of the void space will vary according to fuel operating limits and the particular application. The preferred value for the void space is 15%. Its purpose is to accommodate any swelling of the uranium alloy and to accommodate any fission products produced.

As an alternative to the use of a central void the fuel element core may have a uniformly dispersed porosity of total amount in the range 3–25%. The porosity serves the same purpose as the central void in accommodating any swelling of the fuel. It has the advantage that, in the event of a sheath or end defect in the completed fuel element, water is prevented from penetrating to the relatively hot fuel core where corrosion would be more rapid.

Thus the void space can be provided in the alloy core in the form of either a single extended void space or uniformly dispersed porosity and it has been found that the fuel element can use combinations of these two situations, that is a core of uranium-silicon alloy having uniformly dispersed porosity and also defining a single extended void space. In such an embodiment, using a combination of dispersed porosity and a single extended void space, the total void space has a volume in the range 3–25% of the volume of the uranium-silicon alloy core.

The fuel element is completed by a sheath surrounding the core. The sheath is chosen to provide additional corrosion resistance and restraint so that the swelling of the nuclear fuel is directed inwardly to the void space. The preferred material for the sheath is a corrosion resistant zirconium alloy such as Zircaloy-2, Zircaloy-4 or zirconium-2.5 wt. percent Nb. Some alternative forms of fuel element may instead use stainless steel or aluminum alloy sheaths.

SUMMARY OF THE INVENTION

The method of this invention consists of casting the uranium-silicon alloy either as a rod or billet and heat treating the cast alloy at about 800° C. for a period of time to transform the alloy peritectoidally to the delta phase ($U_3Si$) and slip fitting an alloy sheath over the rod or co-extruding the billet with an alloy to form the sheath, as the case may be, to form the sheathed fuel element. The method of this invention may be varied to perform the step of extrusion or co-extrusion before the heat treatment step. The dispersed porosity is provided in the cast rod by bubbling an inert gas through the molten charge or by inserting a gas-generating liquid or solid in the molten charge.

DESCRIPTION OF THE PREFERRED EMBODIMENTS

The following specific methods of manufacture of the fuel element are included in this invention:

(1) Individual fabrication of the elements followed by slip fit assembly. In one embodiment of this invention this is accomplished by casting the uranium-silicon alloy in a rod containing a central void and then heat treating the rod at a temperature in the range 750°–900° C. preferably at about 800° C. to transform the alloy peritectoidally to the delta phase ($U_3Si$). The exact temperature of heat treatment varies according to the presence of trace constituents in the alloy. Depending on the initial as-cast structure of the alloy and the extent of completion of the transformation required by the application, this process can be completed in a period ranging from 2 hours to 300 hours, typically about 72 hours. The rod is then formed to its final dimensions for a fuel element core by machining or grinding and the fuel element formed by slip fitting the core into a protective sheath.

(2) A method similar to (1) above except that the uranium-silicon alloy is cast as a billet instead of a rod with a central void. After the heat treatment at about 800° C. as in method (1), the billet is extruded, at a temperature less than the peritectoid temperature of 930° C., into a rod containing a central void. The temperature is maintained less than 930° C. to avoid the reverse reaction which would destroy the delta phase condition of the alloy. As before, the rod is then formed to its final dimensions by machining or grinding and the fuel element formed by slip fitting the machined rod or core inside the protective sheath.

(3) A method similar to (2) above except for an inversion of the order in which the heat treatment and extrusion steps are performed. That is, the uranium-silicon alloy is cast as a billet and then extruded into a rod containing a central void. The rod is heat treated at about 800° C., as in method (1), to transform the alloy peritectoidally to the delta phase ($U_3Si$). The rod is then formed to its final dimensions for a fuel element core by machining or grinding and the fuel element formed by slip fitting the core into a protective sheath.

(4) A method having the initial steps set out in (2) above. That is, casting the uranium-silicon alloy as a billet and heat treating the billet at about 800° C., as in method (1). The heat treated billet is then co-extruded inside a zirconium alloy shell at a temperature less than 930° C. to form the fuel element consisting of a core of delta phase uranium-silicon ($U_3Si$) having a central void and clad in and bonded to a zirconium alloy sheath.

(5) A method similar to (4) above except for an inversion of the order in which the heat treatment and co-extrusion steps are performed. That is, the uranium-silicon alloy is cast as a billet and then co-extruded inside a zirconium alloy shell to form a fuel element in which the core has a central void and is clad in and bonded to a zirconium alloy sheath. The fuel element assembly is then heat treated at about 800° C., as in method (1), to transform the uranium-silicon alloy core to the delta phase ($U_3Si$).

(6) A method comprising the step of casting the uranium-silicon alloy as a rod having uniformly dispersed porosity of total amount in the range 3-25% of the volume of the rod. The uranium-silicon alloy rod having uniformly dispersed porosity may be provided by the introduction of a suitable inert gas, such as helium, into the molten charge. This may be achieved by bubbling the gas through the molten alloy. On solidification of the alloy, gas is trapped in the alloy in the form of spherical, closed pores. It has also been found that if the molten alloy, typically at 1500° C., is exposed to an atmosphere of the inert gas sufficient gas is absorbed to produce the desired porosity on solidification.

Alternatively the gas may be introduced into the molten alloy by placing a gas-generating liquid or solid in the mould cavity in which the core is to be formed. Magnesium metal has been found suitable for this purpose. When the gas-generating liquid or solid is brought into contact with the molten alloy, gas is formed which disperses through the alloy and, as before, is trapped in the alloy during solidification forming generally spherical closed pores.

The rod is then treated at about 800° C. as previously described in method (1), to transform the alloy peritectoidally to the delta phase ($U_3Si$). The rod is then formed to its final dimension for a fuel element core by machining or grinding and the fuel element formed by slip fitting the core into a protective sheath.

I claim:

1. A method of manufacturing a nuclear reactor fuel element having a hollow core of delta phase uranium-silicon alloy, $U_3Si$, comprising the steps of:
   casting uranium-silicon alloy in the form of a rod having a central void;
   heat treating said rod at about 750 to about 900° C. for a period of 2 to 300 hours to transform the alloy peritectoidally to the delta phase;
   machining said rod to predetermined dimensions; and
   slip fitting said rod into a protective sheath.

2. A method as defined in claim 1 further comprising the step of bonding a plug of $U_3Si$ to the ends of the rod to seal the central void.

3. A method of manufacturing a nuclear reactor fuel element having a hollow core of delta phase uranium-silicon alloy, $U_3Si$, comprising the steps of:
   casting uranium-silicon alloy in the form of a billet;
   heat treating said billet at about 750 to about 900° C. for a period of 2 to 300 hours to transform the alloy peritectoidally to the delta phase;
   extruding said billet at a temperature less than 930° C. into a rod containing a central void;
   machining said rod to predetermined dimensions; and
   slip fitting said rod into a protective sheath.

4. A method as defined in claim 3 further comprising the step of bonding a plug of $U_3Si$ to the ends of the rod to seal the central void.

5. A method of manufacturing a nuclear reactor fuel element having a hollow core of delta phase uranium-silicon alloy, $U_3Si$, comprising the steps of:
   casting uranium-silicon alloy in the form of a billet;
   heat treating said billet at about 750 to about 900° C. for a period of 2 to 300 hours to transform the alloy peritectoidally to the delta phase;
   co-extruding said billet inside a corrosion resistant alloy sheath at a temperature less than 930° C. to form a $U_3Si$ core having a central void, the core being bonded to the alloy sheath.

6. A method as defined in claim 5 further comprising the step of bonding a plug of $U_3Si$ to the ends of the hollow core to seal the central void.

7. A method of manufacturing a nuclear reactor fuel element having a hollow core of delta phase uranium-silicon alloy, $U_3Si$, comprising the steps of:
   casting uranium-silicon alloy in the form of a billet;
   extruding said billet into a rod containing a central void;
   heat treating said rod at about 750 to about 900° C. for a period of 2 to 300 hours to transform the alloy peritectoidally to the delta phase;
   machining said rod to predetermined dimensions; and
   slip fitting said rod into a protective sheath.

8. A method as defined in calim 7 further comprising the step of bonding a plug of $U_3Si$ to the ends of the rod to seal the central void.

9. A method of manufacturing a nuclear reactor fuel element having a hollow core of delta phase uranium-silicon alloy, $U_3Si$, comprising the steps of:
   casting uranium-silicon alloy in the form of a billet;
   co-extruding said billet inside a corrosion resistant alloy sheath to form a $U_3Si$ core having a central void, the core being bonded to the alloy sheath;
   heat treating said fuel element asembly at about 750 to about 900° C. for a period of 2 to 300 hours to transform the uranium-silicon alloy core peritectoidally to the delta phase.

10. A method as defined in claim 9 further comprising the step of bonding a plug of $U_3Si$ to the ends of the hollow core to seal the central void.

11. A method of manufacturing a nuclear reactor fuel element having a core of delta phase uranium-silicon alloy, $U_3Si$, of uniformly dispersed porosity comprising the steps of:
    casting uranium-silicon alloy as a rod having uniformly dispersed porosity of total amount in the range 3–25% of the volume of the rod;

heat treating said rod at about 750 to about 900° C. for a period of 2 to 300 hours to transform the alloy peritectoidally to the delta phase; machining said rod to predetermined dimensions; and slip fitting said rod into a protective sheath.

12. A method as defined in claim 11 wherein said uniformly dispersed porosity is produced by the step of introducing an inert gas into said uranium-silicon alloy when in a molten condition.

13. A method as defined in claim 12 wherein said gas is introduced by the step of bubbling said gas through the molten alloy.

14. A method as defined in claim 12 wherein said gas is introduced by exposing the molten alloy to an atmosphere of the gas.

15. A method as defined in claim 12 wherein said gas is helium.

16. A method as defined in claim 11 wherein said uniformly dispersed porosity is produced by the step of introducing a gas-generating substance into said uranium-silicon alloy when in a molten condition.

17. A method as defined in claim 16 wherein said gas-generating substance is magnesium metal.

References Cited

UNITED STATES PATENTS

| | | | |
|---|---|---|---|
| 2,731,341 | 1/1956 | Kaufmann | 148—132X |
| 2,894,889 | 7/1959 | Paine | 164—66X |
| 2,898,252 | 8/1959 | Zegler | 148—132 |
| 3,331,748 | 7/1967 | Feraday | 176—70 |
| 3,376,201 | 4/1968 | Bain | 176—67 |

OTHER REFERENCES

Hansen: Constitution of Binary Alloys, McGraw-Hill Book Company, Inc. (1958), pp. 1199, 1200.

JOHN F. CAMPBELL, Primary Examiner

D. C. REILEY, Assistant Examiner

U.S. Cl. X.R.

29—527.5; 148—132; 164—67; 176—70